United States Patent
Lin et al.

(10) Patent No.: US 11,960,082 B2
(45) Date of Patent: Apr. 16, 2024

(54) VIRTUAL REALITY SYSTEM AND OBJECT DETECTION METHOD APPLICABLE TO VIRTUAL REALITY SYSTEM

(71) Applicant: HTC Corporation, Taoyuan (TW)

(72) Inventors: Jyun-Jhong Lin, Taoyuan (TW); Chun-Kai Huang, Taoyuan (TW); Heng-Li Hsieh, Taoyuan (TW); Yun-Jung Chang, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 0 days.

(21) Appl. No.: 17/863,683

(22) Filed: Jul. 13, 2022

(65) Prior Publication Data

US 2024/0019927 A1 Jan. 18, 2024

(51) Int. Cl.
*G02B 27/01* (2006.01)
*G06F 3/00* (2006.01)
*G06F 3/01* (2006.01)
*G06T 19/00* (2011.01)

(52) U.S. Cl.
CPC .......... *G02B 27/017* (2013.01); *G06F 3/005* (2013.01); *G06F 3/011* (2013.01); *G06F 3/012* (2013.01); *G06T 19/006* (2013.01); *G02B 2027/0138* (2013.01)

(58) Field of Classification Search
CPC .......... G06F 3/005; G06F 3/011; G06F 3/012; G02B 27/01; G02B 27/017; G02B 2027/0138; G06T 19/006
USPC ........................................................ 345/156
See application file for complete search history.

(56) References Cited

U.S. PATENT DOCUMENTS

| | | | |
|---|---|---|---|
| 8,854,282 B1* | 10/2014 | Wong | G06F 3/14 345/7 |
| 10,679,428 B1* | 6/2020 | Chen | G06V 10/255 |
| 2017/0011555 A1 | 1/2017 | Li et al. | |
| 2019/0195979 A1 | 6/2019 | Bucknor et al. | |
| 2020/0334908 A1* | 10/2020 | Wilson | G02B 27/0172 |
| 2021/0081047 A1 | 3/2021 | Wang et al. | |
| 2022/0351465 A1* | 11/2022 | Pantpratinidhi | G06T 7/73 |

FOREIGN PATENT DOCUMENTS

CN 105992986 B 3/2019

* cited by examiner

*Primary Examiner* — Jason M Mandeville
(74) *Attorney, Agent, or Firm* — Birch, Stewart, Kolasch & Birch, LLP

(57) ABSTRACT

An object detection method is suitable for a virtual reality system. The object detection method includes a plurality of first cameras of a head-mounted display (HMD) to capture a plurality of first frames. A plurality of second frames are captured through a plurality of second cameras in a tracker, wherein the object detector searches for the object position in the first frames and the second frames.

14 Claims, 4 Drawing Sheets

VIRTUAL REALITY SYSTEM AND OBJECT DETECTION METHOD APPLICABLE TO VIRTUAL REALITY SYSTEM

BACKGROUND OF THE INVENTION

Field of the Invention

The present disclosure relates to a virtual reality system and, in particular, to an object detection method suitable for a virtual reality system.

Description of the Related Art

Generally speaking, a user needs to wear a head-mounted display device to experience a scene in virtual reality. However, when wearing such a head-mounted display device, the user may have already experienced the game, and may not be able to distinguish his/her orientation or physical position in space. If the user needs to find a specific physical object, such as a mobile phone, tablet, sneakers, etc., he/she needs to take off the head-mounted display device to search, which is very inconvenient.

Therefore, how to allow a user to get a physical object without taking off the head-mounted display device while wearing the head-mounted display device has become one of the problems to be solved in the art.

BRIEF SUMMARY OF THE INVENTION

In accordance with one feature of the present invention, the present disclosure provides a virtual reality system. The virtual reality system includes a head-mounted display (HMD) and a tracker. The head-mounted display includes a plurality of first cameras, a storage device, and a processor. The first cameras are configured to capture a plurality of first frames. The processor is configured to access an object detector stored in the storage device to execute the object detector. The processor inputs the first frames and the first map data of each of the first frames into the object detector. The tracker includes a plurality of second cameras. The second cameras are configured to capture a plurality of second frames. The tracker transmits the second map data of each of the second frames to the object detector, and the object detector updates the environment coverage frame according to the first frames, the first map data, the second frames and the second map data, and searches for the object position in the first frames and the second frames.

In accordance with one feature of the present invention, the present disclosure provides an object detection method. The object detection method is suitable for a virtual reality system. The object detection method includes capturing a plurality of first frames through a plurality of first cameras of a head-mounted display (HMD). The processor of the head-mounted display inputs the first frames and the first map data of each of the first frames into the object detector. The processor captures a plurality of second frames using a plurality of second cameras in the tracker. The tracker transmits the second map data of each of the second frames to the object detector, and the object detector updates the environment coverage frame according to the first frames, the first map data, the second frames and the second map data, and searches for the object position in the first frames and the second frames.

To sum up, the embodiments of the present invention provide a virtual reality system and an object detection method suitable for the virtual reality system. Through the object detector, the object position can be found from the frames captured by the head-mounted display device and the tracker. While user is wearing the head-mounted display, the position of physical objects in the environment is indicated through the head-mounted display device. Therefore, the user can get the physical object without taking off the head-mounted display, so that the virtual reality system achieves the effect of providing the user with a more convenient and better experience.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1A:
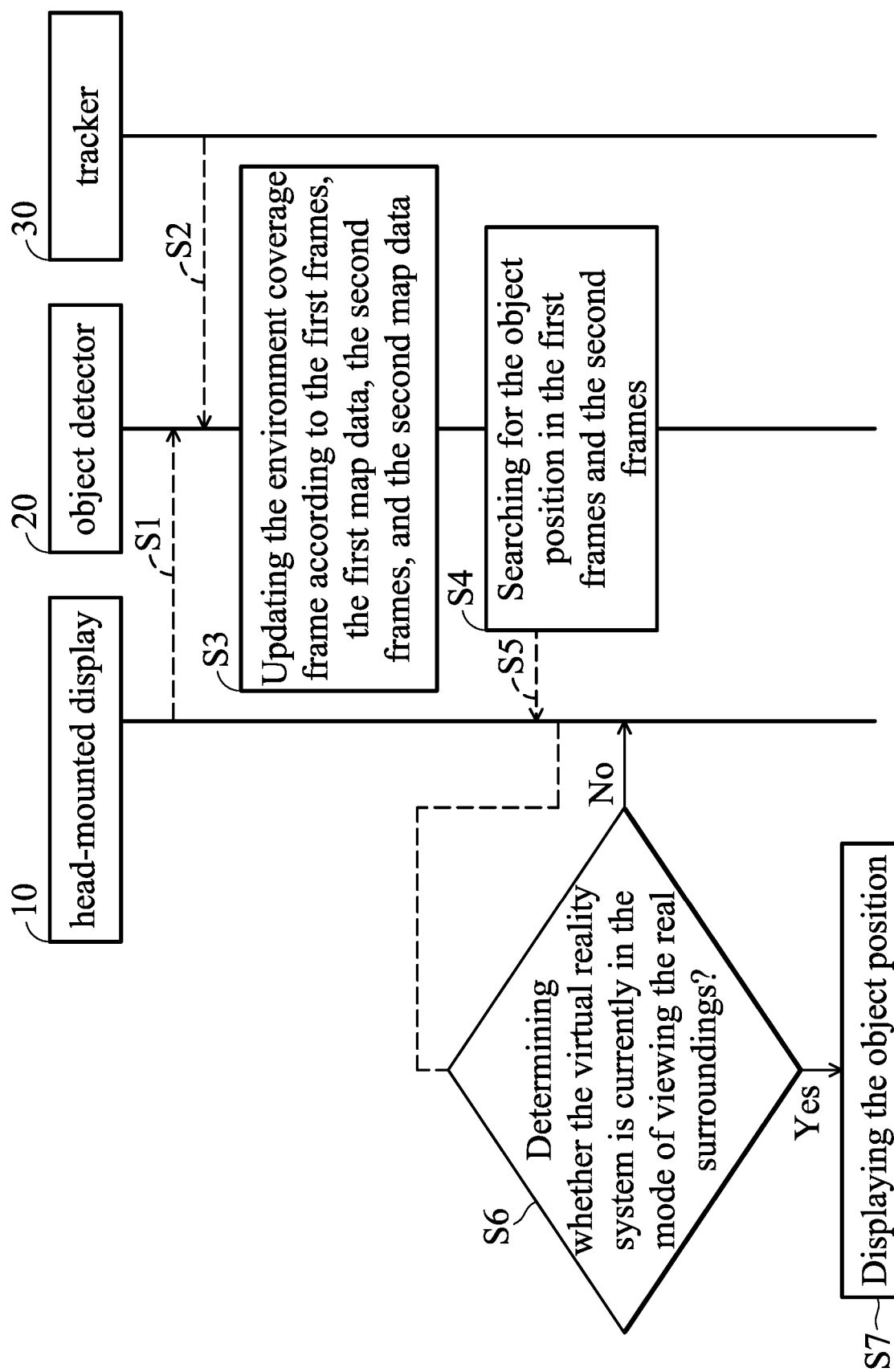
FIG. 1A is a schematic diagram of a virtual reality system in accordance with one embodiment of the present disclosure.

Please refer to FIG. 1A, FIG. 1A is a schematic diagram of a virtual reality system 100 in accordance with one embodiment of the present disclosure. In one embodiment, the virtual reality system 100 includes a head-mounted display (HMD) 10 and a tracker 30. In one embodiment, the head-mounted display 10 includes a plurality of first cameras, a storage device, and a processor. In one embodiment, the tracker 30 includes a plurality of second cameras.

In one embodiment, the head-mounted display 10 includes a storage device. The storage device can be implemented as a read-only memory, a flash memory, a floppy disk, a hard disk, an optical disk, a flash drive, a magnetic tape, a database accessible by network, or a person skilled in the art can easily think of storage media with the same features.

In one embodiment, the processor in the head-mounted display 10 can use a microcontroller, a microprocessor, a digital signal processor, or an application-specific integrated circuit, specific integrated circuit (ASIC) or a logic circuit to implement it.

In one embodiment, the first cameras in the head-mounted display 10 are placed at different positions on the head-mounted display 10 to capture environmental frames.

In one embodiment, the processor in the head mounted display 10 is used to access an object detector 20 stored in the storage device to execute the object detector.

In one embodiment, the object detector 20 can be a thread. Moreover, the object detector 20 is accessed from the storage device and executed by the processor in the head mounted display 10.

Figure 1B:
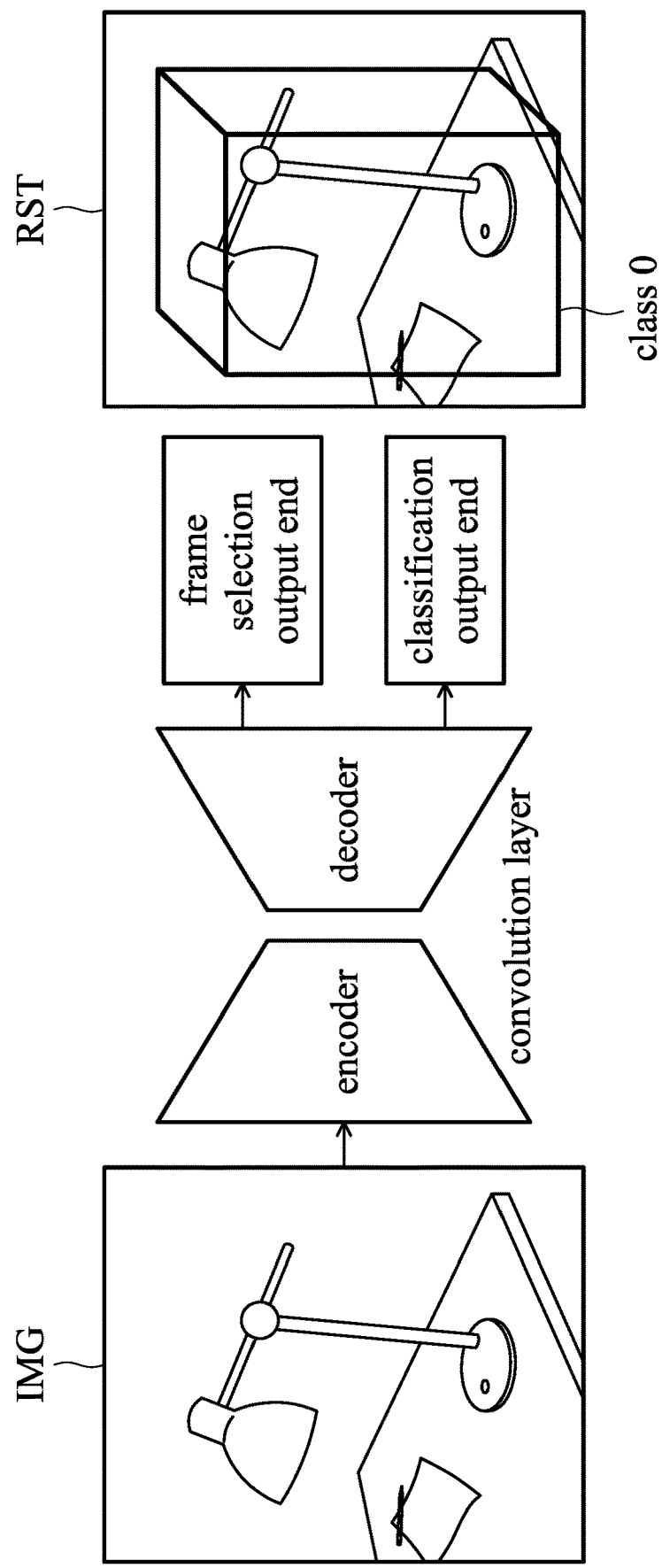
FIG. 1B is a schematic diagram of an object detector in accordance with one embodiment of the present disclosure.

Please refer to FIG. 1B, FIG. 1B is a schematic diagram of an object detector 20 in accordance with one embodiment of the present disclosure. In one embodiment, the object detector 20 can be implemented by region-based convolutional neural networks (R-CNN), and its network function is shown in FIG. 1B. R-CNN can frame the area of a specific object in the picture. The convolutional layer can be roughly divided into an encoder and a decoder. When a frame (such as a frame IMG) is input to the encoding end of the convolution layer, after a neural network-like operation, the decoding end outputs: box head and class head. In this example, the desk lamp is preset as a specific object. Through the information of the frame selection output end (used to find and frame specific objects) and the classification output end (used to classify objects), the desk lamp area in the frame IMG can be framed. That is, a frame output result RST including the frame-selected area is generated, and the frame output result RST includes the frame-selected desk lamp area and classification information (for example, the classification code class 0 corresponds to the desk lamp). In this way, specific objects in the frame can be framed and classified by the object detector 20.

In one embodiment, before the virtual reality system 100 is shipped from the factory, the object detector 20 is trained by using frames of a plurality of objects preset in advance. The objects are various objects such as mobile phones, tablets, mice, sneakers, etc. Until the training results converge, the training will be regarded as completed. The trained object detector 20 is stored in a storage device in the head-mounted display 10. However, the present case is not limited thereto, and the object detector 20 can also be updated or trained according to the user's needs after leaving the factory.

In one embodiment, the trained object detector 20 can also be written into a chip to become a hardware component in the head-mounted display 10.

In one embodiment, the object detector 20 can also be implemented by a hardware circuit.

In one embodiment, after the virtual reality system 100 is shipped from the factory, the user can select the object position to be detected through an object detection list displayed on the display of the head-mounted display 10. For example, the user can select objects such as mobile phones and sneakers, and the virtual reality system 100 can detect the position of the objects selected by the user through the object detector 20 when the virtual reality system 100 is operating.

In one embodiment, the tracker 30 includes a plurality of second cameras. For example, the tracker 30 can be attached to the user's wrist through a strap. In the virtual reality, the virtual reality system 100 can know the position and movement state of the wrist in the virtual reality through the tracker 30.

In one embodiment, the tracker 30 has a plurality of second cameras that capture in different directions, so that environmental frames from various perspectives can be captured. For convenience of description, the frame captured by the second camera is referred to as the second frame below.

In one embodiment, the virtual reality system 100 includes a plurality of trackers 30, and the trackers 30 can be fixed on the user's limbs, rackets, or other objects.

In one embodiment, the head-mounted display 10 and the tracker 30 can establish a communication connection through a wired or wireless manner.

The steps of implementing the object detection method through the head-mounted display 10, the object detector 20 and the tracker 30 of the virtual reality system 100 of FIG. 1A are described below. In the following steps S1 to S7, the object position to be found is the position of the mobile phone as an example. However, the present invention is not limited thereto.

In step S1, the processor of the head-mounted display 10 inputs the first frames and the first map data of each of the first frames to the object detector 20.

In step S2, the tracker 30 transmits the second map data of each of the second frames to the object detector 20.

In one embodiment, the second frames are captured by a plurality of cameras on the tracker 30.

In step S3, the object detector 20 updates the environment coverage frame according to the first frames, the first map data, the second frames, and the second map data.

In one embodiment, when the object detector 20 determines that the first map data and the second map data are different from the existing data at the same location, this means that the actual environment may be changed, such as family members moving the placement of the mobile phone. Therefore, the object detector 20 updates the environment coverage frame, and overwrite the existing corresponding map data and its frame with the map data and its frame obtained at the latest time point.

In one embodiment, the respective cameras of the head-mounted display 10 and the tracker 30 only capture important information, such as the area including the map point MP. In one embodiment, the head mounted display 10 and/or the tracker 30 ignores and does not process previously transmitted frames with the same position and no change.

The map point MP may refer to a feature point. In the frame, the edges, corners, areas with obvious color blocks, areas with special colors, and areas that are easy identified can be used as feature points. The feature points are also marked on a region of interest (ROI), for example, the region of interest is the object position selected by the user to be found (or displayed).

Since the map point MP can be regarded as a feature point, the following description takes the feature point MP as an example.

In one embodiment, the environment coverage frame must include all feature points MP.

In one embodiment, the object detector 20 needs to cover the surrounding environment with the fewest frames, and these frames need to contain all the feature points MP. In other words, each frame transmitted to the object detector 20 is a key frame, and the key frame must cover a certain degree of environmental feature points MP, and the key frame will be retained by the object detector 20.

In this way, the object detector 20 can cover the surrounding environment with the minimum number of frames. Moreover, before transmitting the frame, the head mounted display 10 and the tracker 30 will check whether the frame in the same position has been transmitted, whether the frame is overlapped, or the frame has not been changed. In other words, the head mounted display 10 and the tracker 30 only transmit the key frame. That is, a frame that has not been transmitted or an updated frame (for example, in the same position, but an object image in the frame is moved) is sent to the object detector 20. Therefore, the object detector 20 will not receive duplicates of the same frame.

In one embodiment, the total amount of feature points MP is determined by simultaneous localization and mapping (SLAM) technology. The SLAM technology will continue to establish the feature point MP until it is no longer needed, and the feature points MP that represent the probably important features of the environment have been found.

In one embodiment, the object detector 20 may set a threshold to determine whether to retain the received key frame. For example, the threshold value is 15%, which means that the feature points MP in the key frame must less than 15% of the feature points MP with each of the shared existing key frames before it will be retained. For example, the currently received key frame has a total of 100 feature points MP, if any key frame contains more than 16 shared map points in the key frames retained by the object detector 20, the object detector 20 does not retain this key frame.

In one embodiment, the key frame retained by the object detector 20 has a viewing angle for each feature point MP. For example, key frame A and key frame B can jointly observe a feature point MP. If the viewing angles of key frame A and key frame B are greater than 60 degrees, the feature point MP considers key frame A and key frame B as different map points.

In one embodiment, when the new key frame with similar positions (for example, the distance is less than 5 cm) contains 87 different feature points MP, which is more than the 86 feature points MP contained in the current key frame, the object detector 20 discards the current key frame, and keeps the new key frame.

In this way, when the feature points MP change greatly (maybe the actual environment is changing, such as someone is cleaning, moving objects, or the user is moving to other rooms), the object detector 20 updates the key frame of the changed feature points MP whenever necessary.

In step S4, the object detector 20 searches for the object position in the first frames and the second frames.

In one embodiment, the virtual reality system 100 can receive the location set by the user to search for the mobile phone (object). For example, the user selects the location of the mobile phone to be detected through the object detection list displayed on the display of the head-mounted display 10, and the object detector 20 searches for the location of the mobile phone in the first frames and the second frames. Since the object detector 20 is a pre-trained model, the appearance of the mobile phone can be identified from the first frames and the second frames.

Thereby, the user can obtain the location of the mobile phone. More specifically, in step S5, after the object detector 20 finds the location of the mobile phone, the object detector 20 transmits the location of the mobile phone (e.g., three-dimensional coordinates) to the head-mounted display 10.

In this way, the display of the head-mounted display 10 can present the position of the mobile phone to the user, so that the user can take the mobile phone without taking off the head-mounted display 10.

In one embodiment, the display of the head-mounted display 10 is in a VR office or a see-through mode to see the real surroundings, and presents the position of the mobile phone, which will not affect the user's gaming experience.

In one embodiment, the object detection method can include steps S6-S7.

In step S6, the processor in the head-mounted display 10 determines whether the virtual reality system 100 is currently in the mode of viewing the real surroundings, and if so, the process proceeds to step S7, and if not, the process is disabled.

In step S7, the display of the head-mounted display 10 displays the object position (in this example, the object position refers to the position of the mobile phone).

In one embodiment, the head mounted display 10 transmits the initial map information to the tracker 30 during initialization. Both the head-mounted display 10 and the tracker 30 use the same simultaneous localization and mapping (SLAM) technology. The tracker 30 integrates the initial map information transmitted from head-mounted display 10 and the map information collected by tracker 30 itself, so as to improve the initial map information of the tracker 30 itself. The tracker 30 periodically transmits the pose to the head-mounted display device 10. The head-mounted display 10 uses these poses to calibrate the tracker 30 poses recognized by the head-mounted display 10.

In one embodiment, when the relative poses of both the head-mounted display 10 and the tracker 30 have been calibrated to be stable, the processor of the head-mounted display 10 begins to focus on detecting the poses of the head-mounted display 10.

In one embodiment, the multiple feature points MP can be used to make the positioning of the SLAM technology used by both the head-mounted display 10 and the tracker 30 more accurate during positioning.

Please refer to FIGS. 2-5, FIGS. 2-5 are schematic diagrams of an object detection method in accordance with one embodiment of the present disclosure.

Figure 2:
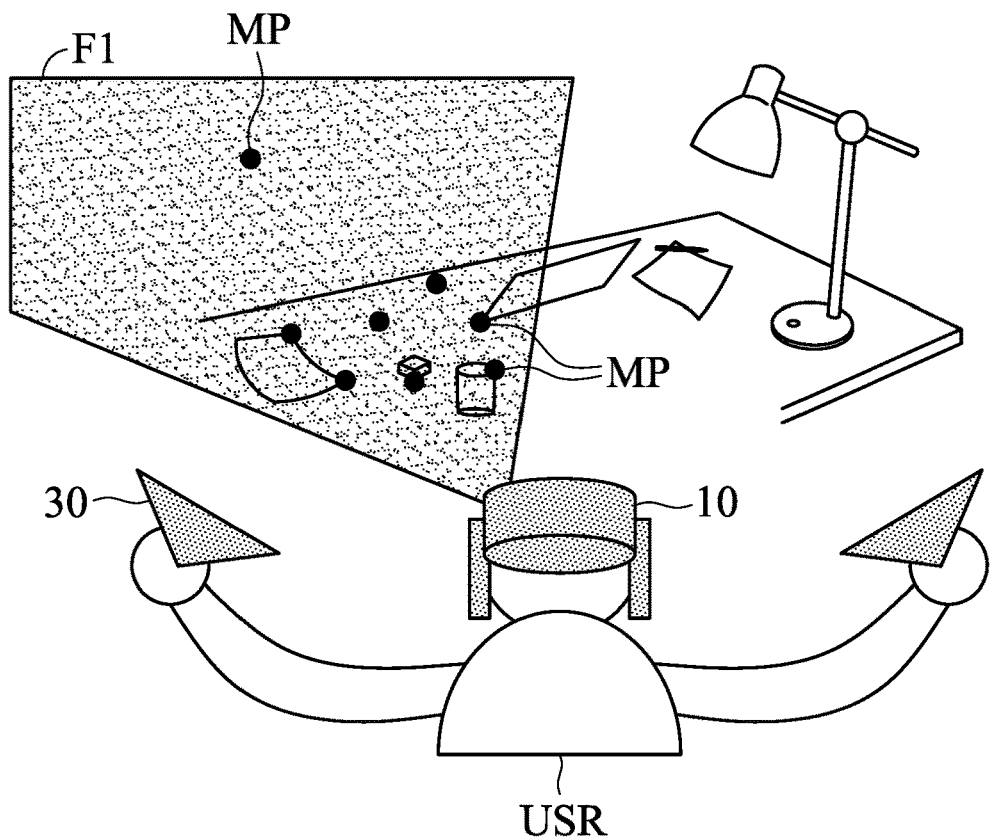
FIG. 2 is a schematic diagram of an object detection method in accordance with one embodiment of the present disclosure.

In one embodiment, please refer to FIG. 2, when the user USR wears the head-mounted display 10 and the tracker 30, a plurality of first cameras on the head-mounted display device 10 captures a plurality of first frames.

In one implementation, the first frames include a specific HMD frame, the specific HMD frame covers a specific HMD field of view (FOV) F1, and the specific HMD field of view F1 includes a plurality of feature points MP (each feature point MP is represented by a solid circle).

In one embodiment, the object detector 20 detects whether the specific UND field of view F1 contains an object frame (such as a sneaker). In response to the object detector 20 detecting that the specific HMD field of view F1 contains an object frame, the object detector 20 selects the object field of view F2 of the object frame from the specific HMD field of view F1. Moreover, the object field of view F2 is smaller than the specific HMD field of view F1.

Figure 3:
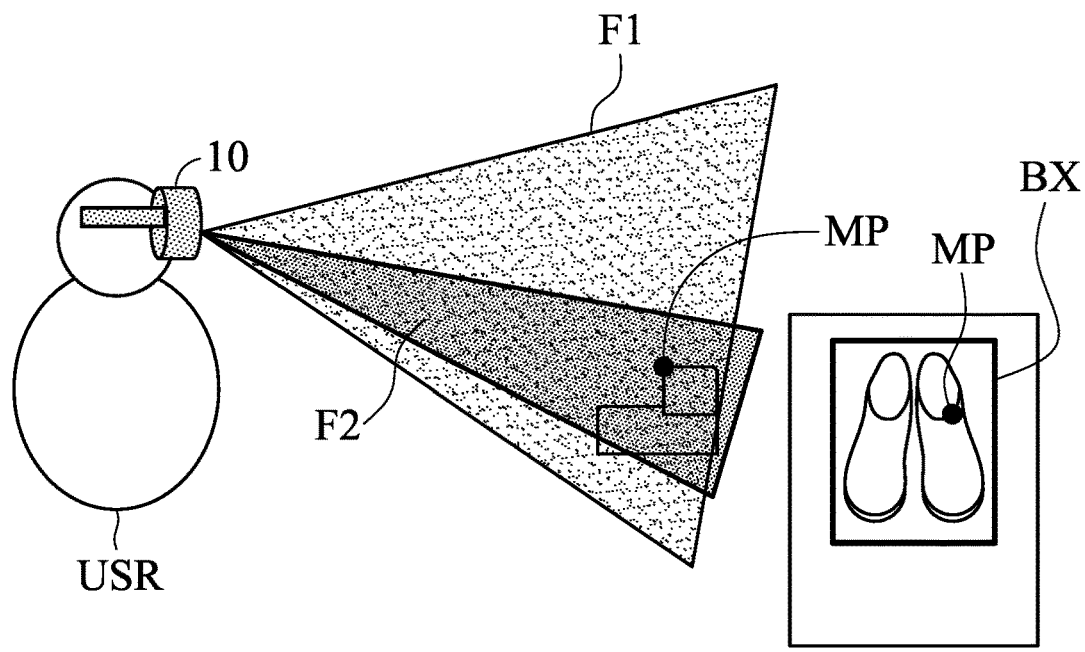
FIG. 3 is a schematic diagram of an object detection method in accordance with one embodiment of the present disclosure.

In one embodiment, please refer to FIG. 3, when the user USR wears the head-mounted display 10, at least one of the first cameras captures an object frame (such as a sneaker). In response to the object detector 20 detecting that the object frame is contained in the specific HMD field of view F1, the object detector 20 selects the object field of view F2 of the object frame from the specific HMD field of view F1.

As can be seen from FIG. 3, the viewing angle of the specific HMD field of view F1 is larger than the viewing angle of the object field of view F2, and the object field of view F2 is located in the specific HMD field of view F1.

As can be seen from FIG. 3, after the object detector 20 detects the feature points MP of the actual sneaker, the object detector 20 selects the sneaker frame to form a frame selection range BX, and the frame selection range BX can be three-dimensional. Therefore, the object detector 20 can frame the object field of view F2 of the object frame along the projection range of the frame selection range BX.

The feature points MP in the frame selection range BX is the feature points MP in the object field of view F2. The large and small stacked rectangular blocks in the object field of view F2 represent sneakers. The frame selection range BX is within the object field of view F2, and the frame selection range BX represents that the sneakers are framed. For the convenience of explanation, the actual sneaker appearance of the frame selection range BX, that is, the frame actually seen by the user USR, is drawn on the right side of FIG. 3.

In one embodiment, the object field of view F2 and the specific HMD field of view F1 are each a cone-shaped three-dimensional space frame projected from a specific HMD camera among the same first cameras. In other words, when the object detector 20 selects the position of the sneakers and generates the frame selection range BX, the processor of the head-mounted display 10 or the object detector 20 can capture the ray projection path of the frame selection range BX along the specific HMD camera, so as to obtain the cone-shaped three-dimensional space frame (i.e., the object field of view F2 of the object frame).

Figure 4:
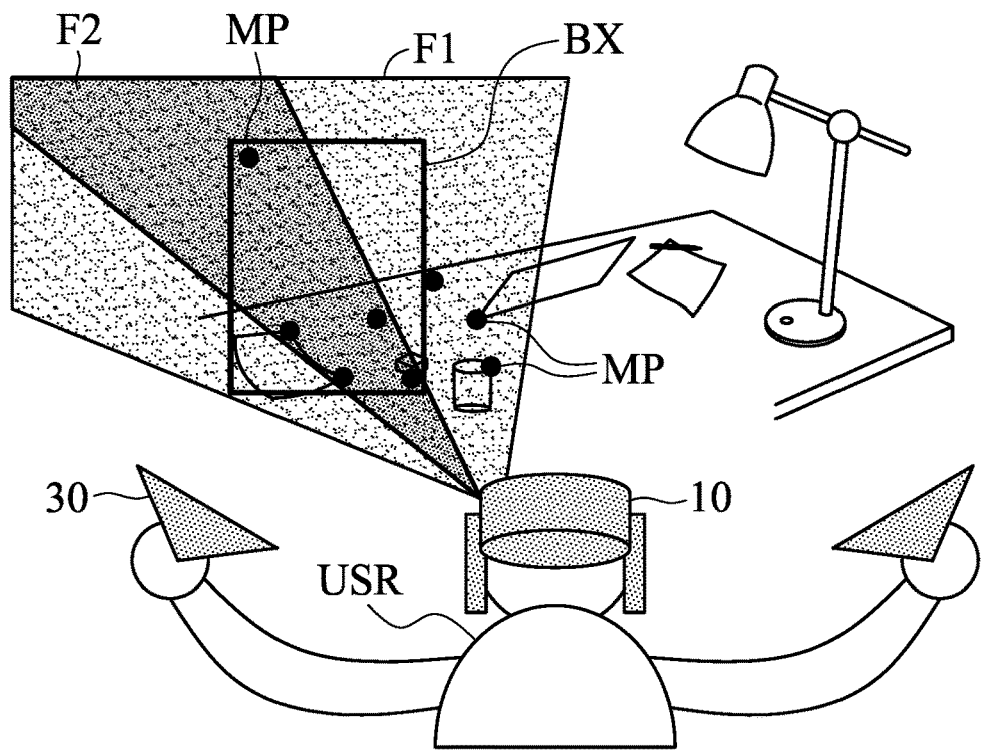
FIG. 4 is a schematic diagram of an object detection method in accordance with one embodiment of the present disclosure.

Please refer to FIG. 4, FIG. 4 is a schematic diagram of a scene based on the perspective behind the user USR in accordance with one embodiment of the present disclosure. FIG. 3 is a schematic diagram of a scene based on the side view of the user's USR. FIG. 4 and FIG. 3 only show different perspectives to explain this example. In one embodiment, the object detector 20 sets the initial three-dimensional object position (i.e., the frame selection range BX) according to a plurality of specific feature points in the object field of view F2 (i.e., 5 specific feature points in the frame selection range BX). Moreover, the five specific feature points are all located in the three-dimensional space, so the initial three-dimensional object position connected according to the five specific feature points is a three-dimensional space.

Figure 5:
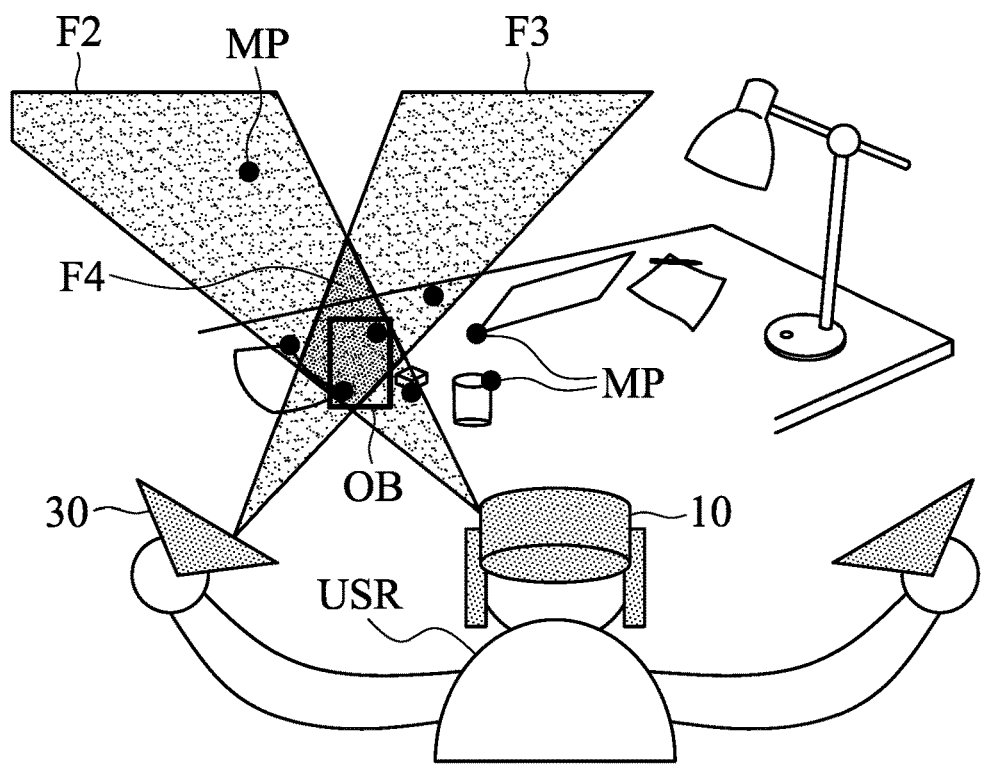
FIG. 5 is a schematic diagram of an object detection method in accordance with one embodiment of the present disclosure

In one embodiment, please refer to FIG. 5, the second frames captured by the second camera on the tracker 30 include a specific tracker frame. The specific tracker frame covers a specific tracker field of view F3. The specific tracker field of view F3 and the object field of view F2 have a three-dimensional intersection area F4.

In one embodiment, the specific tracker field of view F3 is also a cone-shaped three-dimensional space frame.

In one embodiment, the object detector 20 sets the object position OB according to a plurality of target feature points MP in the three-dimensional intersection area F4.

In one embodiment, the object detector 20 regards the feature points MP in the three-dimensional intersection area F4 as the target feature points MP. The target feature points MP represents the feature points MP to which the object specified by the user USR belongs.

As can be seen from the example in FIG. 5, there are two target feature points MP in the three-dimensional intersection area F4, and the object detector 20 sets the object position OB according to the two target feature points MP (as in the previous example, here is t where the sneakers are placed).

In one embodiment, if the user USR sets to search for the location of the mobile phone at the beginning, after the object detector 20 has gone through the steps described above corresponding to FIGS. 2 to 4, as shown in FIG. 5, the range of the two target feature points MP is regarded as the mobile phone position. In one embodiment, when the display of the head-mounted display 10 is in the VR office or see-through mode to see the real surroundings, the display of the head-mounted display 10 shows the position of the mobile phone, so that the user does not need to take the head-mounted display 10 off. The head-mounted display 10 can also get a mobile phone, and it will not affect the user's gaming experience.

In one embodiment, even if the object detector 20 receives a new first frame and/or a second frame updated in the specific HMD field of view F1, a new three-dimensional intersection area F4 is generated. However, in this new three-dimensional intersection area F4, the space corresponding to the previous object position OB (for example, there are 2 target feature points MP in the previous object position OB and 5 target feature points in the new three-dimensional intersection area F4, representing the object position OB has more target feature points MP). The new three-dimensional intersection area F4 does not reduce the number of feature points MP, which means that the previous object position OB is still correct, and the previous object position OB is still selected.

To sum up, the embodiments of the present invention provide a virtual reality system and an object detection method suitable for the virtual reality system. Through the object detector, the object position can be found from the frames captured by the head-mounted display device and the tracker. While user is wearing the head-mounted display, the position of physical objects in the environment is indicated through the head-mounted display device. Therefore, the user can get the physical object without taking off the head-mounted display, so that the virtual reality system achieves the effect of providing the user with a more convenient and better experience.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A virtual reality system, comprising:
   a head-mounted display (HMD), configured to be fixed on a head of a user, and comprising:
   a plurality of first cameras, configured to capture an environment to obtain a plurality of first frames, wherein the environment comprises an object;
   a storage device; and
   a processor, configured to access an object detector stored in the storage device to execute the object detector, wherein the processor inputs the first frames and a first map data of each of the first frames into the object detector; and a tracker, configured to be fixed on a limb of the user, and comprising:
a plurality of second cameras, configured to capture the environment to obtain a plurality, of second frames;
wherein the tracker transmits the second frames and a second map data of each of the second frames to the object detector, and the object detector updates an environment coverage frame in response to a determination that the first map data and the second map data are different from existing data at a same location, determines a three-dimensional intersection area of the first frames and the second frames, wherein the intersection area comprises a plurality of target feature points corresponding to the object, and searches for an object position of the object in the first frames and the second frames according to the plurality of target feature points.

2. The virtual reality system of claim 1, wherein the first frames comprise a specific HMI) frame, the specific HMD frame covers a specific HIM field of view (FOV), and the specific MID field of view comprises a plurality of feature points.

3. The virtual reality system of claim 2, wherein the object detector detects whether an object frame is comprised in the specific HMI) field of view; in response to the object detector detecting that the object frame is comprised in the specific HMD field of view, the object detector frames an object field of view of the object frame from the specific HMD field of view;
wherein the object field of view is smaller than the specific HMD field of view.

4. The virtual reality system of claim 3, wherein the object field of view and the specific HMD field of view are respectively a cone-shaped three-dimensional space frame projected from a same specific HUD camera among the first cameras.

5. The virtual reality system of claim 3, wherein the object detector sets an initial three-dimensional object position according to a plurality of specific feature points in the object field of view.

6. The virtual reality system of claim 5, wherein the second frames comprise a specific tracker frame, and the specific tracker frame covers a specific tracker field of view;
wherein the specific tracker field of view and the object field of view have the three-dimensional intersection area.

7. The virtual reality system of claim 6, wherein the object detector sets the object position according to the plurality of target feature points in the three-dimensional intersection area.

8. A object detection method, suitable for a virtual reality system, wherein the object detection method comprises:
capturing an environment to obtain a plurality of first frames through a plurality of first cameras of a head-mounted display (MMD), wherein the head-mounted display (HMD) is configured to be fixed on a head of a user, and the environment comprises an object;
executing the following steps using a processor of the head-mounted display:
inputting the first frames and a first map data of each of the first frames into an object detector; and
capturing the environment to obtain a plurality of second frames using a plurality of second cameras in a tracker, wherein the tracker is configured to be fixed on a limb of the user;
wherein the tracker transmits the second frames and a second map data of each of the second frames to the object detector, and the object detector updates an environment coverage frame in response to a determination that the first map data and the second map data are different from existing data at a same location, determines a three-dimensional intersection area of the first frames and the second frames, wherein the intersection area comprises a plurality of target feature points corresponding to the object, and searches for an object position of the object in the first frames and the second frames according to the plurality of target feature points.

9. The object detection method of claim 8, wherein the first frames comprise a specific HMD frame, the specific HMD frame covers a specific HMD field of view (FOV), and the specific HMD field of view comprises a plurality of feature points.

10. The object detection method of claim 9, further comprising:
detecting whether an object frame is comprised in the specific HMD field of view using the object detector; in response to the object detector detecting that the object frame is comprised in the specific HMD field of view, the object detector frames an object field of view of the object frame from the specific HMD field of view;
wherein the object field of view is smaller than the specific HMD field of view.

11. The object detection method of claim 10, wherein the object field of view and the specific HMD field of view are respectively a cone-shaped three-dimensional space frame projected from a same specific HMD camera among the first cameras.

12. The object detection method of claim 10, wherein the object detector sets an initial three-dimensional object position according to a plurality of specific feature points in the object field of view.

13. The object detection method of claim 10, wherein the second frames comprise a specific tracker frame, and the specific tracker frame covers a specific tracker field of view;
wherein the specific tracker field of view and the object field of view have the three-dimensional intersection area.

14. The object detection method of claim 13, further comprising:
setting the object position through the object detector according to the plurality of target feature points in the three-dimensional intersection area.

\* \* \* \* \*